Jan. 15, 1929.　　　　　　　　　　　　　　　　　　　1,699,071
G. A. KINNEY
LAWN TRIMMER
Filed March 12, 1927.
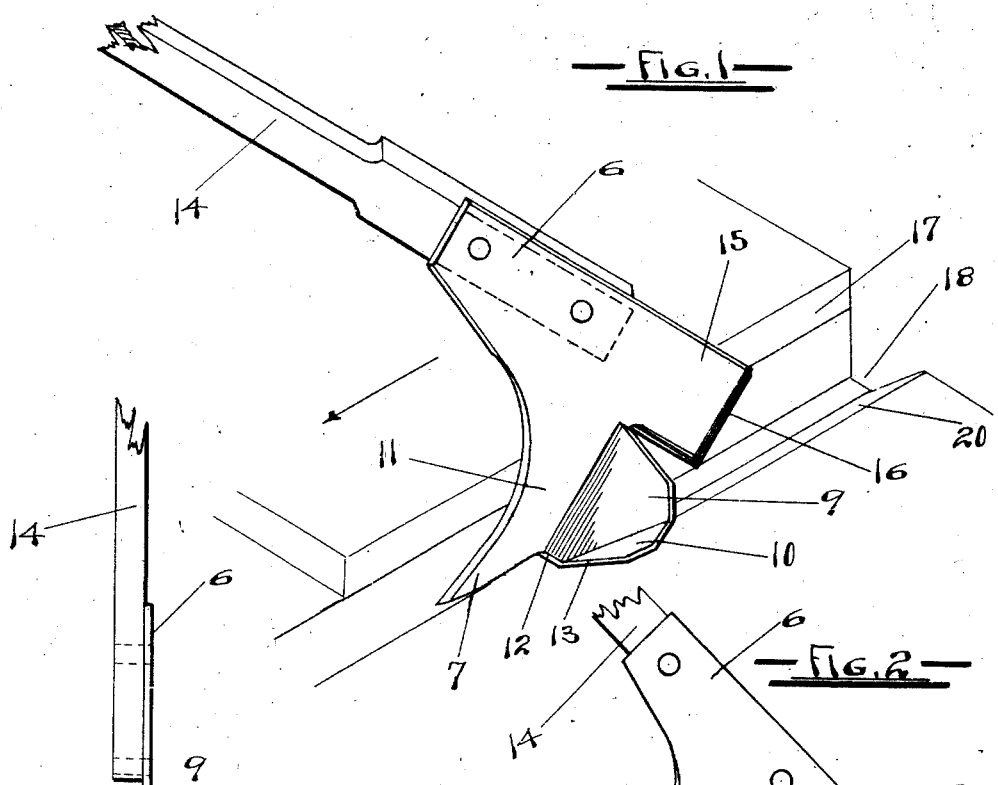
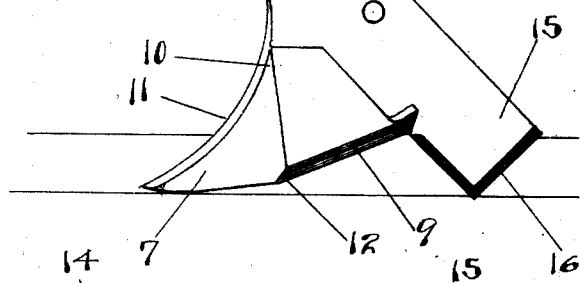
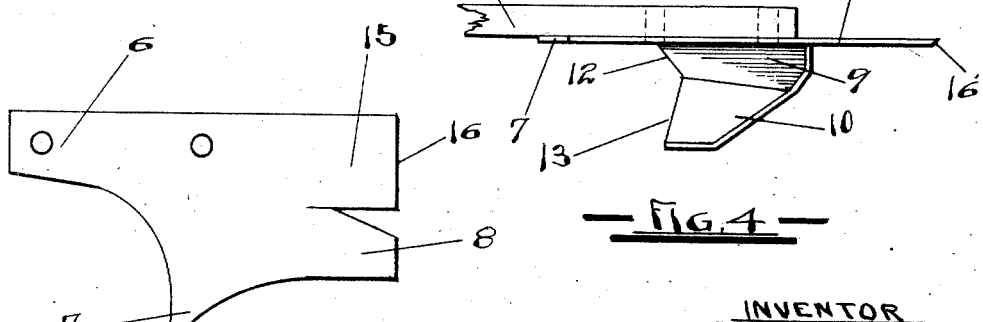
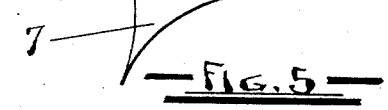
INVENTOR
GUSTAV A. KINNEY
BY C. F. Blake
ATTY Patented Jan. 15, 1929.

1,699,071

UNITED STATES PATENT OFFICE.

GUSTAV A. KINNEY, OF PORTLAND, OREGON.

LAWN TRIMMER.

Application filed March 12, 1927. Serial No. 174,979.

My invention relates to lawn trimmers in general, and particularly to such lawn trimmers as are adapted for trimming the lawn edges. The object of my invention is to provide in a cheap device an article that will be easily guided along the edge of a walk such as concrete or the like, and will trim the lawn grass away from said walk and leave a clean ditch, at the same time depositing the removed material upon the lawn edge whence it may be easily raked up and removed.

I accomplish this object by means of the construction illustrated in the accompanying drawing, which is a part of this application for Letters Patent, like characters of reference indicating like parts throughout the several views thereof, and in which:

Fig. 1 is a perspective view of my device in operating position.

Fig. 2 is a side elevation of the same.

Fig. 3 is an end elevation of my device in operating position.

Fig. 4 is a plan view of the device.

Fig. 5 is a developed view of the same, showing the cut shape of the material the device is formed from.

In general my device consists of a flat plate provided with a curved forwardly disposed cutting point, and a ditch forming portion positioned to one side of said point and rearward thereof, the whole being formed from a single piece of thin plate material.

The cheapness of manufacture of my device is evident since it is formed by cutting and bending a single piece of thin sheet material as shown in Fig. 5, and a handle attached to the finished device. The cut sheet is divided into three main portions, a handle attaching portion 6, a cutting point 7, and a portion 8 which is to be bent into the ditch forming part of the device.

The portion 8 is first bent at a substantial right angle to the portion 6 to form the back 9 of the ditch forming part of the device, and the outer end of said portion 8 is then further bent at an angle with the back 9 to form the side 10 of the ditch forming part. The cutting point 7 projects forward from the ditch forming part as shown in Figs. 1 and 2, and is ground to a cutting edge as shown at 11. The edges designated 12 and 13 of the ditch forming part are also ground to a cutting edge. The handle 14 is secured to the handle attaching portion 6 of the device, and said portion 6 is projected rearward of the ditch forming part, to form a rear guide 15. The edge 16 of said rear guide 15 is ground to a cutting edge and is designed to be used as a spade if desired.

In use the device is placed with the point 7 and guide 15 against the edge of the walk 17, and is pulled along in the direction of the arrow, as shown in Fig. 1. The result is that the lawn is trimmed right up to the walk, and a ditch 18 is left with a clean cut lawn edge 20, as shown in Fig. 1.

My device may be made of any size, and constructed of any materials deemed convenient and suitable for a device of this character, and while I have illustrated and described a form of construction found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new and desire to secure by Letters Patent is:

1. In a lawn trimmer: a forwardly positioned downwardly projecting cutting point, an upwardly and forwardly projecting handle attaching member, and a rearwardly and downwardly projecting guide, said point, member and guide lying in the same vertical plane; and a ditch forming member intermediate said point and said guide, composed of a back disposed at a substantial right angle to said point and guide, and a side upwardly and forwardly projecting from said back.

2. In a lawn trimmer: a cutting point, a rear guide, and a ditch forming member intermediate said point and said guide, said point, guide and member being formed from a single piece of sheet material.

3. In a law trimmer: a piece of sheet material formed into a handle attaching member, a cutting point and a guide; and a ditch forming member bent from said sheet of material and disposed intermediate said point and said guide.

4. In a law trimmer: a cutting point and a guide adapted to be drawn along the edge of a walk, and a ditch forming member integral with said point and said guide and disposed intermediate thereof.

In witness whereof I claim the foregoing as my own I hereto affix my signature at Portland, county of Multnomah, State of Oregon, this 1st day of Feb., 1926.

GUSTAV A. KINNEY.